United States Patent [19]

Rosen et al.

[11] 4,101,443

[45] Jul. 18, 1978

[54] TRANSIENT ANTIFOAM COMPOSITIONS

[75] Inventors: Meyer Robert Rosen, Spring Valley; Samuel Sterman, Chappaqua, both of N.Y.

[73] Assignee: Union Carbide Corporation, New York, N.Y.

[21] Appl. No.: 691,394

[22] Filed: Jun. 1, 1976

[51] Int. Cl.² ............................................. B01D 17/00
[52] U.S. Cl. ..................................... 252/358; 252/321
[58] Field of Search ................. 252/358, 321, DIG. 1

[56] References Cited

U.S. PATENT DOCUMENTS

| | | | |
|---|---|---|---|
| 3,015,645 | 1/1962 | Tyler | 260/46.5 R |
| 3,024,126 | 3/1962 | Brown | 106/308 Q |
| 3,383,327 | 5/1968 | Sullivan | 252/358 |

FOREIGN PATENT DOCUMENTS

| | | | |
|---|---|---|---|
| 698,179 | 11/1964 | Canada | 252/358 |
| 1,079,832 | 8/1967 | United Kingdom | 252/358 |

*Primary Examiner*—Benjamin R. Padgett
*Assistant Examiner*—Josephine Lloyd
*Attorney, Agent, or Firm*—Reynold J. Finnegan

[57] ABSTRACT

Transient, non-aqueous antifoam compositions which comprise the product resulting from heating a silica filler and a condensation product of a partially hydrolyzed trifunctional silane.

8 Claims, No Drawings

TRANSIENT ANTIFOAM COMPOSITIONS

BACKGROUND OF THE INVENTION

This invention relates to novel transient antifoam compositions.

Silicone antifoams prepared from an inorganic filler, e.g. silica and a variety of organosiloxane polymers are well known in the art. However, many of such types of antifoams are generally hydrolytically stable in aqueous media with the exception of very acid or basic media. The good stability of such antifoams can be a detriment in a variety of applications. For example, since many of such compositions are not biodegradable, they can contribute to undesired stream pollution. Further, such materials may cause problems in certain applications due to an undesirable buildup of silicone oil such as fabric spotting in textile dyeing and in the coating of hydrocarbon analyzers used in waste water treatment plants. Moreover, good hydrolytic stability of an antifoam can be a detriment where short term foaming control is desired such as in the processing and packaging of foamy liquids such as shampoos, liquid cleaners, and the like. Thus, there is a clear need for transient antifoams in the art which will control undesirable foaming during the processing and packaging of liquids but which will not adversely affect the foaming properties of the liquids that are desired upon the use of said liquids.

It has now been discovered that antifoam compositions based on condensation products of partially hydrolyzed trifunctionalsilanes can be prepared which possess the property of transience, i.e. hydrolytic instability in aqueous foaming media.

Therefore, it is an object of this invention to provide novel antifoam compositions that are transient in aqueous foaming media. Other objects and advantages of this invention will become readily apparent from the following description and appended claims.

More particularly this invention is directed to a transient non-aqueous antifoam composition, said composition consisting essentially of the product resulting from heating, in the absence of water, a mixture consisting essentially of a finely divided silica filler and a condensation product of a partially hydrolyzed trifunctional silane, said condensation product having a residual alkoxy content of at least about 9 percent by weight, said silane being selected from the group consisting of $RSiX_3$ and $RSi(OR')_3$ wherein R and R' are alkyl radicals and X is a halogen atom, and wherein the amount ratio of said silica filler to said condensation product ranges from about 1 to about 33 parts by weight of the silica filler per 100 parts by weight of the condensation product.

DESCRIPTION OF THE PREFERRED EMBODIMENTS

The finely divided silica fillers employed in this invention are finely powdered materials that are well known in the art such as precipitated silica, fumed silica, and the like. Such fillers preferably have an average particle diameter size of about 7 to about 25 millimicrons, preferably in the range of about 7 to about 14 millimicrons, as calculated from the surface area (BET Method), assuming spericity of particles, J. Am. Chem. Soc. Vol. 60, page 309. (1938) It is to be understood that the fillers employed herein are essentially non-aqueous and that silica hydrosols are excluded from the definition of the term finely divided silica as employed herein.

The condensation products of partially hydrolyzed trifunctional silanes employed herein and/or methods for their preparation are well known in the art. For instance, said condensation products can be prepared by the conventional known methods of partial hydrolysis and condensation. As is well known in the art, hydrolyzates represent the metathetical reaction products of corresponding hydrolyzed silanes, while the condensation products represent the siloxanate products obtained upon condensation of the hydrolyzed reaction mixture.

The hydrolyzable trifunctional silanes used in the preparation of the condensation products employed in this invention are those silanes of the formulas $RSiX_3$ and $RSi(OR')_3$ wherein X represents a halogen atom, preferably chlorine, R represents an alkyl radical having from 1 to 5 carbon atoms and R' represents an alkyl radical having from 1 to 4 carbon atoms. Illustrative radicals represented by R include alkyl radicals such as methyl, ethyl, propyl, isopropyl, butyl, isobutyl, tertiary butyl, amyl, and the like. Most preferably R is a lower alkyl radical having from 1 to 3 carbon atoms, especially methyl. Radicals represented by R' include methyl, ethyl, propyl, butyl, isobutyl, and the like. More preferably R' is methyl or ethyl, especially ethyl. Said hydrolyzable trifunctional silanes are well known in the art, illustrative examples of same include methyltrichlorosilane, methyltrimethoxysilane, methyltriethoxysilane, amyltriethoxysilane, ethyltriethoxysilane, ethyltrichlorosilane, and the like.

Thus, the method for obtaining the partial hydrolyzates of said hydrolyzable trifunctional silanes is not critical and any conventional method known in the art can be employed. For instance said partial hydrolyzate can be obtained by mixing the desired silane or mixtures thereof to be partially hydrolyzed with water in the case of trialkoxysilanes or water and an alcohol in the case of trihalosilanes and refluxing the mixture until the desired degree of hydrolysis is obtained. The reaction conditions are conventional and not critical, e.g. normally the reaction temperature may range from about room temperature to reflux and the hydrolysis is generally completed within three hours. The amount of water employed need of course only correspond to that amount required to furnish the degree of partial hydrolysis desired as determined by the desired degree of residual alkoxy content present in the desired condensation product. It should be also understood that in the case of trihalosilane starting materials sufficient alcohol is employed to convert in situ all the halogen radicals to alkoxy radicals, said alcohols corresponding to the residual alkoxy groups on the desired condensation product. Likewise in the case of trialkoxysilane starting materials, a catalyst, e.g. hydrochloric acid, and a solvent, e.g. an alcohol, such as ethanol, can be employed, if desired.

The condensation products used in this invention are obtained through the condensation of said partial hydrolyzates and can of course be recovered in any conventional manner known in the art such as by neutralization if desired, followed by stripping all the water, as well as the solvent and catalyst if employed, and any undesired by-products from the partial hydrolyzed reaction mixture. Thus, said condensation products are essentially nonaqueous siloxanate materials, the predominant species of which may be represented by the general formula

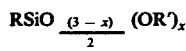

wherein R and R' are the same as defined above and wherein the value of x corresponds to the residual alkoxy content of the condensation product. Said condensation products employed herein have a residual alkoxy content of at least about 9 percent by weight and more preferably from about 40 to 50 percent by weight. The preferred condensation products are those that also have a viscosity in the range from about 10 to 50 centipoises (more preferably about 10 to 20 centipoises) at 25° C. Of course it is to be understood that the condensation products employed herein encompass those co-condensation products obtained on partial cohydrolysis if desired of a mixture of one or more of said hydrolyzable trifunctional silanes.

As pointed out above, the transient, non-aqueous antifoam compositions of this invention are prepared by heating at an elevated temperature, a mixture consisting essentially of a finely divided silica filler and a condensation product of a partially hydrolyzed trifunctional silane, said materials having been defined above. Typically, the elevated temperature can be about 80° to about 200° C., preferably about 100° to 170° C. The period of heating is not narrowly critical and, for example, can range from at least about ¼ hour to about 5 hours or longer if desired, with the preferred period being about ½ hour to about 3 hours. Preferably the mixture is sheared prior to the heating operation to thoroughly disperse the filler in the condensation product. If desired the mixture can be mildly agitated during the heating operation. After the heating operation the mixture need not be further processed in any way, the desired transient non-aqueous antifoam composition normally being recovered merely by allowing the reacted mixture to cool to room temperature. However, if desired, the resulting heated mixture may be subjected to any heretofore conventional antifoam recovery operation. The term non-aqueous as employed herein means that the transient antifoam compositions of this invention contain less than 1 percent by weight of water, if indeed they contain any measurable amount of water at all. Moreover the process employed for preparing the transient non-aqueous antifoam compositions in the instant invention is carried out in the absence of water, i.e. there is no deliberately added water and the reactants are essentially non-aqueous. The reaction mixture of filler and condensation product can be formed in any conventional manner such as by simply blending the materials together or employing a conventional high shear mixer.

While the transient non-aqueous antifoam compositions of this invention are preferably produced without the use of a catalyst, a catalyst can be employed if desired. When employed, the catalysts may be any of the well known types heretofore employed in the preparation of antifoam compositions such as the acid catalysts disclosed in U.S. Pat. No. 3,235,509 and the basic catalysts of U.S. Pat. No. 3,506,401.

The amounts of the above mentioned silica filler, condensation product and catalyst, if employed, that are mixed and heated to produce the transient nonaqueous antifoam compositions of this invention are not narrowly critical. Typical ranges of amounts of these magerials defined above, include from about 1 to about 33 (preferably about 3 to about 20) parts by weight of the finely divided silica filler per 100 parts by weight of the condensation product employed. Of course, if employed the amount of catalyst need only be a catalytic amount.

The transient, non-aqueous antifoam compositions of this invention can be employed to prevent or destroy the foam formation of an aqueous or non-aqueous foam forming media. Thus the compositions of this invention are useful in many applications wherein foaming is not desired, such as in the preparation and use of aqueous media systems, e.g. shampoos, waste-water treatment, fermentation processing, paper making, paints, latex systems, cleaning compounds, laundry and detergent products, and the like. Moreover, because of the transient nature of the antifoam compositions of this invention said compositions can be especially useful in applications where short term foaming control is desired such as in waste-water treatment and in the processing and packaging of foam liquids such as shampoos, liquid cleaners and the like, and possibly even in the processing and packaging of beverages, such as beer. The transient non-aqueous antifoam compositions of this invention can be employed as such or in the form of solvent solutions. Illustrative preferred dispersing solvents include, e.g. Dimethyl Cellosolve (Ansul Corporation) and other similar glycol ethers. The antifoam compositions of this invention, because of their hydrolytic instability, are not suited for use in the form of aqueous emulsions. It is apparent of course that the utility in a specific area will depend upon the foaming media system to which the antifoam is to be applied and the resultant antifoam activity desired for said system.

Of course, it is to be understood that not every antifoam composition encompassed by the instant invention will be equally effective and equally transient in their performance. For instance, antifoam compositions based on amylsilane and containing about 10 parts by weight of silica filler have been found to be very poorly transient, yet have exhibited hydrolytic instability when containing about 3 parts by weight of silica filler. The determination of optimum desired results for a given antifoam composition is well within the knowledge of one skilled in the art and can be met by routine experimentation by following the teachings of this invention.

The following examples are illustrative of the present invention and are not to be regarded as limiting. It is to be understood that all parts, percentages and proportions referred to herein are by weight unless otherwise indicated and that Me represents a methyl radical ($-CH_3$).

TEST PROCEDURES

In the Examples appearing below the following test procedures were used to determine the effectiveness of the antifoams.

Bubbling Test (Test I)

About 0.1 gram of the antifoam tested was added to about 250 grams of a freshly prepared homogeneous 0.5 percent by weight aqueous Green Soap (Eli Lilly and Company) solution in a stoppered graduate. The graduate was gently inverted several times until the antifoam was dispersed in the soap solution. About 100 grams of the liquid mixture (antifoam and soap solution) was then added to a 1000 cc. graduate. A nitrogen bubbler containing a porous glass frit was then inserted in the graduate. Nitrogen was bubbled into the liquid mixture at a flow rate equal to the flow rate that produced 1000 cc.

of foam (foam and liquid) in 2 minutes from 100 grams of said soap solution in the absence of any antifoam agent. The foam volume produced by each liquid mixture (antifoam and soap solution) is then recorded by reading the height of the foam in the graduate at 5 and 10 minute intervals. The dispersibility and antifoaming activity of the antifoam tested is indicated by the recorded volume of foam so produced, the lower the foam volume the more dispersed and effective the antifoam. The volume of foam generated after five minutes has a reproducibility of about ±20 cc, while the foam volume generated after ten minutes has a reproducibility of about ±50 cc.

Mechanical Shaking Test (Test II)

About 0.05 grams of the antifoam (1000 ppm) to be tested was placed in an 8 oz. wide mouth jar to which was added about 50 grams of aqueous Green Soap (Eli Lilly and Company) solution (about 0.5% by wt.). The jar was then covered and shaken on a wrist action shaker for 2 minutes. The jar was held to the shaker by a three-prong clamp which is 25 cm. away from the central shaking bar (measured from the center of the jar). The angle of shaking was set at 10 (the maximum). After the 2 minute shaking period the jar was removed and 1 minute later the height of empty space (cm. of foam breakdown) was measured. If no foam was present, the cm. of foam breakdown was at the maximum value of 7.3 cm. If the jar was full of foam (which happened when just the Green Soap solution was employed), the cm. of foam breakdown is 0. The results are reported in terms of percent foam breakdown. For example, if there is 5 cm. of foam breakdown then the $$\text{Percent Foam Breakdown} = \frac{5}{7.3} \times 100 = 69\%$$

The control was run with 50 grams of said 0.5% aqueous Green Soap solution which gives 0% foam breakdown. The transient behavior of the antifoam composition was evidenced by observing the loss in antifoaming activity with time upon the same test mixtures.

EXAMPLE 1

A condensation product of a partially hydrolyzed silane was prepared as follows.

About 234 grams (1.0 mole) of amyltriethoxysilane, $C_5H_{11}Si(OC_2H_5)_3$, and about 253.8 grams of anhydrous ethanol was added to a three-neck, 1000 ml. flask equipped with a thermometer, magnetic stirrer, heating mantle, condenser and dropping funnel and the mixture heated to reflux. Then about 29.8 grams of concentrated HCl was added (dropwise) and the reaction mixture refluxed for 3 hours and 10 minutes. The reaction mixture was compatible (clear) and the desired condensation product of the partially hydrolyzed silane recovered by stripping the refluxed fluid of all its volatiles, i.e. alcohol, acid catalyst and water at 100° C. using a water aspirator. The desired condensation product was a siloxanate which may be considered as having the general formula

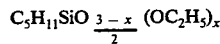

Analysis of said desired condensation product showed it to have a viscosity of about 33.7 centipoises at 25° C.; a surface tension of about 25.4 dynes/cm.; and contain about 27.6 percent by weight of residual ethoxy groups, about 1.1 percent by weight of hydroxy groups and about 18.6 percent by weight of silicon.

EXAMPLE 2

The procedure of Example 1 was repeated except that about 117 grams of amyltriethoxysilane, about 351 grams of anhydrous ethanol and about 42.5 grams of concentrated HCl (27 grams of water) were used and the reaction mixture refluxed for 4 hours. Analysis of the recovered desired condensation product of the partially hydrolyzed silane stripped of all its volatiles showed the product to contain about 9.38 percent by weight of residual ethoxy groups, about 3.3 percent by weight of hydroxy groups and about 21.6 percent by weight of silicon.

EXAMPLE 3

A condensation product of a partially hydrolyzed silane was prepared on a plant scale as follows. About 19750 lbs. of methyltrichlorosilane, $MeSiCl_3$, along with about 7300 lbs. of anhydrous ethanol was feed to a reaction kettle. After about 4000 lbs. of the silane had been added, about 1700 lbs. of water was simultaneously added to the kettle along with the rest of the silane and ethanol. After adding said reactants the reaction mixture was cooled to 70° C. and refluxed for 2½ hours. The mixture was then cooled to about 83° to 86° C. and all its volatiles i.e. alcohol, acid catalyst, and water, removed by vacuum stripping at 2 pounds pressure. As the stripping rate fell the vacuum pressure was increased to just less than about 100 mm. pressure. The stripping was carried out over 2 hours at 135° C. The stripped mixture was then cooled to 100° C. and activated carbon used to remove the color. The mixture was then neutralized with propylene oxide until the chlorine content was less than 0.01 percent followed by vacuum stripping to remove said propylene oxide. The desired condensation product so recovered was a siloxanate which may be considered as having the general formula

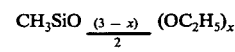

Analysis of said desired condensation product showed it to have a viscosity of about 17 centipoises at 25° C. and contain about 47.1 percent by weight of residual ethoxy groups.

EXAMPLE 4

A non-aqueous antifoam composition was prepared by stirring about one gram of finely divided fumed silica filler into about 10 grams of the condensation product of Example 1 until the mixture was homogeneous. The mixture was then subjected to high shear by passing it through a small orifice and then heated for about 2 hours at about 150° C.

EXAMPLE 5

A non-aqueous antifoam composition was prepared by stirring about one gram of finely divided fumed silica filler into about 10 grams of the condensation product of Example 2 until the mixture was homogeneous. The mixture was then subjected to high shear by passing it through a small orifice and then heated for about 2 hours at about 150° C.

EXAMPLE 6

A non-aqueous antifoam composition was prepared by repeating the procedure of Example 5, except this time about 0.3 grams of the fumed silica filler was used.

EXAMPLE 7

A non-aqueous antifoam composition was prepared by stirring about 1 gram of finely divided fumed silica into about 10 grams of the condensation product of Example 3 until the mixture was homogeneous. The mixture was then subjected to high shear by passing it through a small orifice and then heated for about 2 hours at about 150° C. The viscosity of the antifoam composition product was about 240 centistokes at 25° C. (Cannon Fenske Viscometer No. 400).

The antifoam composition product was then tested for effectiveness according to the Bubbling Test (Test I) defined above. The average (4 runs) foam volume recorded after 5 minutes was 755 cc. (Standard deviation about 30). However during the 10 minute test period the foam column broke apart indicating very poor antifoam performance over the longer test time period.

EXAMPLE 8

A solubilized antifoam composition was prepared by mixing 2 grams of the antifoam composition product of Example 7 with 98 grams of Dimethyl Cellosolve (Ansul Corporation) until homogeneous. The solubilized antifoam was then tested for effectiveness according to the Bubbling Test (Test I) defined above, using 2 grams of the solubilized antifoam composition and 98 grams of the same soap solution. The average (9 runs) foam volume recorded after 5 minutes was 424 cc. (Standard deviation about 26); while the average (9 runs) foam volume after ten minutes was 498 cc. (Standard deviation about 45). This example demonstrated the improved antifoam performance obtained upon solubilizing the antifoam with a dispersing solvent.

EXAMPLE 9

The antifoam composition product of Example 7 was tested for its effectiveness according to the Mechanical Shaking Test (Test II) defined above. The following Table shows that antifoam activity gradually decreased as the antifoam-soap solution was aged over a period of days demonstrating the transient (hydrolytic instability) nature of the antifoam composition. The results of this test are given in the following Table.

TABLE

| Antifoam-Soap Solution Days Aged | % Foam Breakdown |
|---|---|
| Fresh | 88 |
| 1 | 70 |
| 5 | 43 |
| 10 | 29 |
| 17 | 22 |

The control (soap solution without antifoam) gave a ten percent foam breakdown after having been aged for 17 days.

EXAMPLE 10

The antifoam composition product of Example 4 was tested for its activity according to the Mechanical Shaking Test (Test II) defined above. A 92 percent foam breakdown was recorded for the freshly prepared antifoam-soap solution as contrasted to a zero percent breakdown for the control soap solution minus the antifoam composition.

EXAMPLE 11

A solubilized antifoam composition was prepared by mixing 2 grams of the antifoam composition product of Example 5 with 98 grams of Dimethyl Cellosolve until homogeneous. The solubilized antifoam was then tested for effectiveness according to the Bubbling Test (Test I) defined above, using 2 grams of the solubilized antifoam composition and 98 grams of the same soap solution. The average (2 runs) foam volume recorded for the freshly prepared solubilized antifoam-soap solution after 5 minutes was 680 cc., while it was 860 cc. after 10 minutes. The test was repeated on the same solubilized antifoam-soap solution after it had been aged for seven days and the foam volume recorded after five minutes was 710 cc., while it was 800 cc. after 10 minutes.

EXAMPLE 12

A solubilized antifoam composition was prepared by mixing 2 grams of the antifoam composition product of Example 6 with 98 grams of Dimethyl Cellosolve until homogeneous. The solubilized antifoam was then tested for effectiveness according to the Bubbling Test (Test I) defined above, using 2 grams of the solubilized antifoam composition and 98 grams of the same soap solution. The average (2 runs) foam volume recorded for the freshly prepared solubilized antifoam-soap solution after 5 minutes was 540 cc., while it was 650 cc. after ten minutes. The test was repeated on the same solubilized antifoam-soap solution after it had been aged for 7 days and the average (2 runs) foam volume recorded after 5 minutes was 660 cc., while it was 700 cc. after 10 minutes.

Note that while Example 11 does not indicate that the antifoam composition is transient, Example 12 demonstrates that by employing less silica filler the antifoam composition became transient.

EXAMPLE 13

About 250 cc. of a model shampoo foaming solution consisting of about 15% wt. of triethanolamine lauryl sulfate, about 2% wt. lauric diethanolamide and about 83% wt. distilled water were added to about 0.1 gram of the antifoam composition product of Example 7. After shaking to disperse the antifoam, 125 cc. of said solution-antifoam dispersion was placed in an 8 oz. wide mouth jar, which was covered and shaken 10 times (one shake equaling one up and down motion). The tested antifoam composition showed good antifoam effectiveness based on the qualitative observation that there was only slight foam visible at the walls of the jar, but no foam in the center of the jar.

EXAMPLE 14

The solubilized antifoam composition of Example 8 was prepared on a larger scale using the same ingredients and ratio of ingredients.

Thus, about a 120 pound preparation of antifoam composition was prepared by mixing and shearing about 12 pounds of finely divided fumed silica filler with about 108 pounds of the condensation product of Example 3 which was then heated for about 2 hours at about 150° C. About 2 grams of the antifoam composition thus prepared was then solubilized with about 98 grams of Dimethyl Cellosolve dispersing solvent until homogeneous.

The solubilized antifoam composition so produced was then tested for effectiveness according to the Bubbling Test (Test I) defined above, using 2 grams of the solubilized antifoam composition and 98 grams of the same soap solution. The foam volume recorded after 5 minutes was 395 cc., while it was 480 cc. after 10 minutes.

EXAMPLE 15

The solubilized antifoam composition of Example 14 was aged at 50° C. for 1 week and then tested for effectiveness according to the Bubbling Test (Test I) defined above, using 2 grams of the solubilized antifoam composition and 98 grams of the same soap solution. The foam volume recorded after 5 minutes was 400 cc., while it was 460 cc. after 10 minutes. This example demonstrates that the solubilized antifoam composition has good heat stability.

Various modifications and variations of this invention will be obvious to a worker skilled in the art and it is to be understood that such modifications and variations are to be included within the purview of the application and the spirit and scope of the appended claims.

What is claimed is:

1. A transient non-aqueous antifoam composition, said composition consisting essentially of the product resulting from heating, in the absence of water, a mixture consisting essentially of a finely divided silica filler and a condensation product of a partially hydrolyzed trifunctional silane, said condensation product having a residual alkoxy content of at least about 9 percent by weight, said silane being selected from the group consisting of $RSiX_3$ and $RSi(OR')_3$ wherein R is an alkyl radical having 1 to 5 carbon atoms, R' is an alkyl radical having 1 to 4 carbon atoms and X is a halogen atom, and wherein the amount ratio of said silica filler to said condensation product ranges from about 1 to about 33 parts by weight of the silica filler per 100 parts by weight of the condensation product.

2. An antifoam composition as defined, in claim 1, wherein the filler is fumed silica.

3. An antifoam composition as defined in claim 2, wherein R is a methyl radical, R' is an ethyl radical and X is a chlorine radical, wherein the condensation product has a residual ethoxy content of from about 40 to 50 percent by weight, and wherein the amount of ratio of said filler to said condensation product ranges from about 3 to about 20 parts by weight of the filler per 100 parts by weight of the condensation product.

4. An antifoam composition as defined in claim 3, wherein the heating temperature ranges from about 80° to about 200° C.

5. An antifoam composition as defined in claim 3, wherein the mixture is sheared and then heated at a temperature in the range of about 100° C. to about 170° C. for at least ½ hour.

6. An antifoam composition as defined in claim 5, wherein the condensation product has a viscosity of about 10 to 20 centipoises at 25° C.

7. A solvent solution of an antifoam composition as defined in claim 1.

8. A solvent solution of an antifoam composition as defined in claim 5.

* * * * *